United States Patent [19]

Aquarius

[11] Patent Number: 4,717,573

[45] Date of Patent: Jan. 5, 1988

[54] PROCESS FOR THE MANUFACTURE OF LOLLIPOPS, A DEVICE TO BE USED FOR THIS PURPOSE AND THE PRODUCT OBTAINED FROM THIS PROCESS

[75] Inventor: Coenrardus H. Aquarius, Maaseik, Belgium

[73] Assignee: Enrique Bernat Fontlladosa, Barcelona, Spain

[21] Appl. No.: 736,694

[22] Filed: May 22, 1985

[30] Foreign Application Priority Data

Mar. 18, 1985 [BE] Belgium ............................. 2/60646

[51] Int. Cl.4 .............................................. A23G 3/12
[52] U.S. Cl. .................................... 426/274; 426/134; 426/91; 425/126 S
[58] Field of Search ................. 426/90, 91, 104, 134, 426/660, 658, 512, 89, 279, 280, 281, 282, 274, 275, 390, 391; 425/126 S

[56] References Cited

U.S. PATENT DOCUMENTS

| | | | |
|---|---|---|---|
| 2,121,185 | 6/1938 | Claff | 426/104 |
| 3,477,394 | 11/1969 | Tidwell | 426/91 |
| 3,829,262 | 8/1974 | Aquarius | 425/126 S |
| 3,879,162 | 4/1975 | Aquarius | 425/126 S |
| 4,159,612 | 7/1979 | Johnson et al. | 426/134 |
| 4,229,482 | 10/1980 | Kreske | 426/104 |

FOREIGN PATENT DOCUMENTS 7613131  5/1978  Netherlands ................. 425/126 S

*Primary Examiner*—Raymond N. Jones
*Assistant Examiner*—Carolyn Paden
*Attorney, Agent, or Firm*—Baker & McKenzie

[57] ABSTRACT

A process for the production of lollipops, with the characteristic that it consists of the consecutive forming of two separate lollipop parts from sugar paste, the insertion of a quantity of sweets to be enclosed in the lollipop between these parts and the joining together of the abovementioned parts so that they completely encapsulate the quantity of sweets to be enclosed.

2 Claims, 5 Drawing Figures

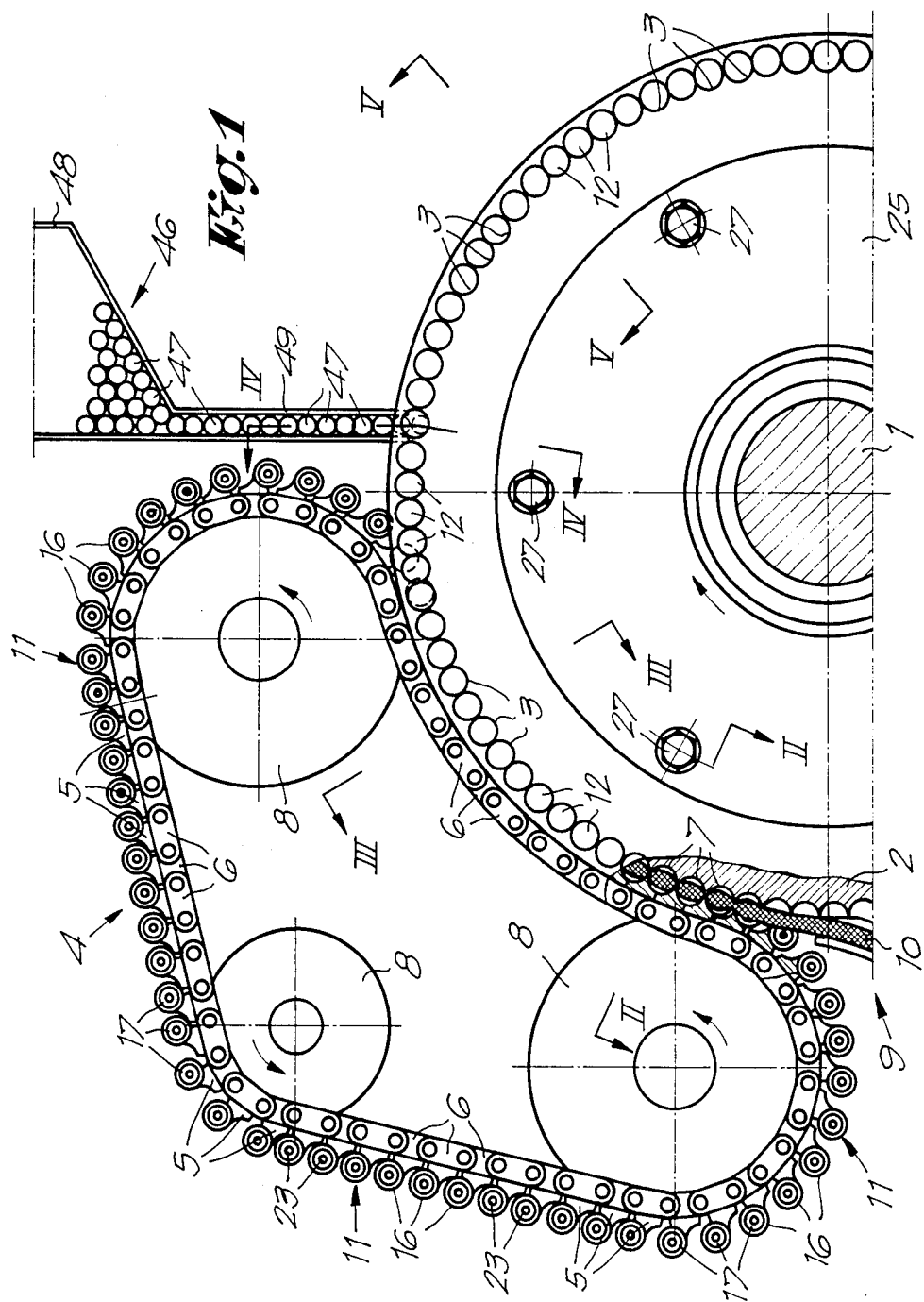

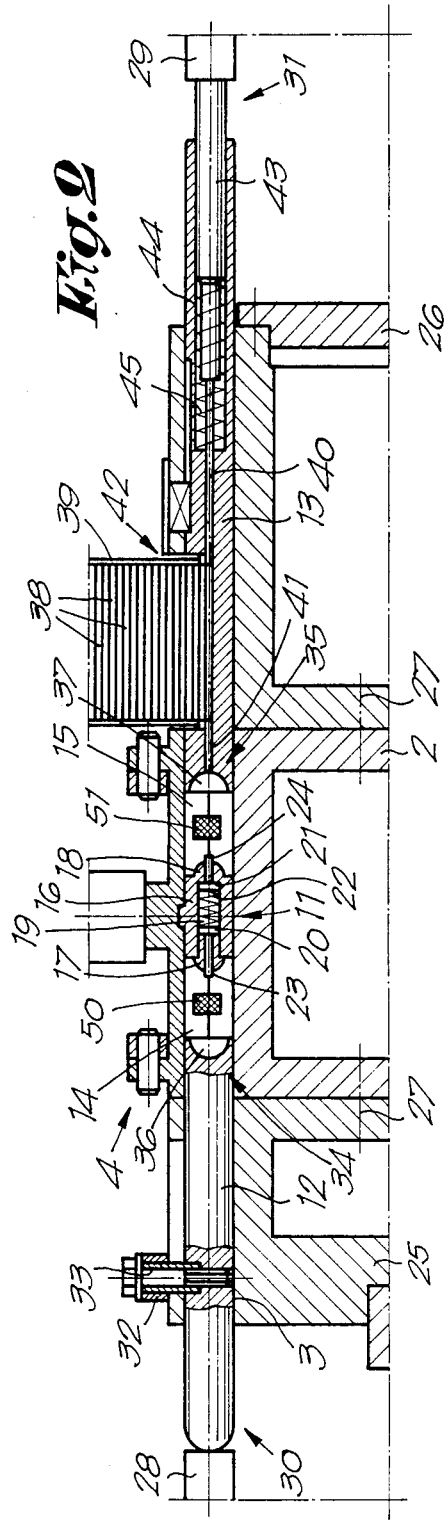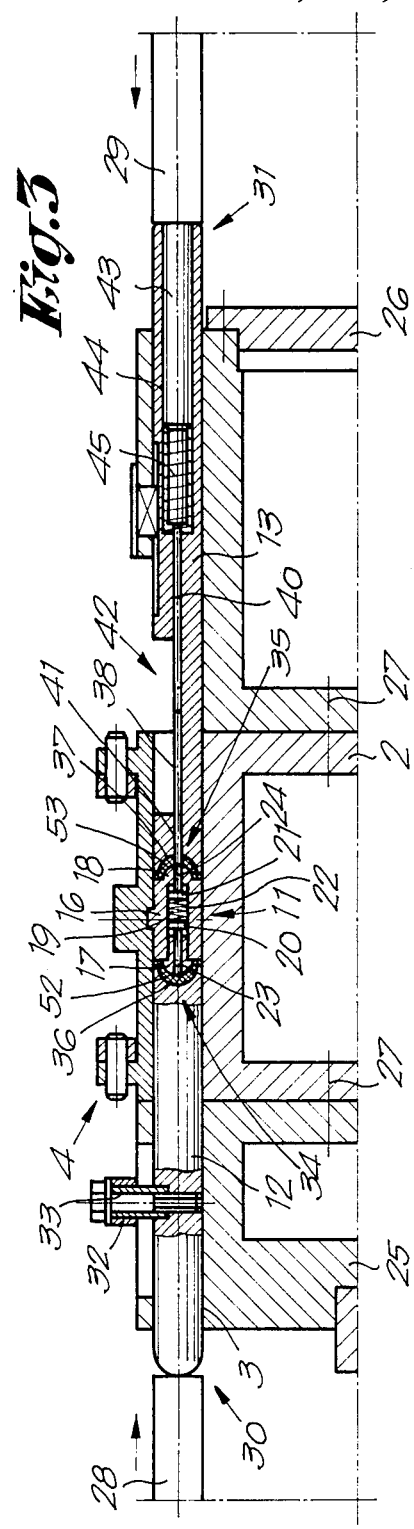

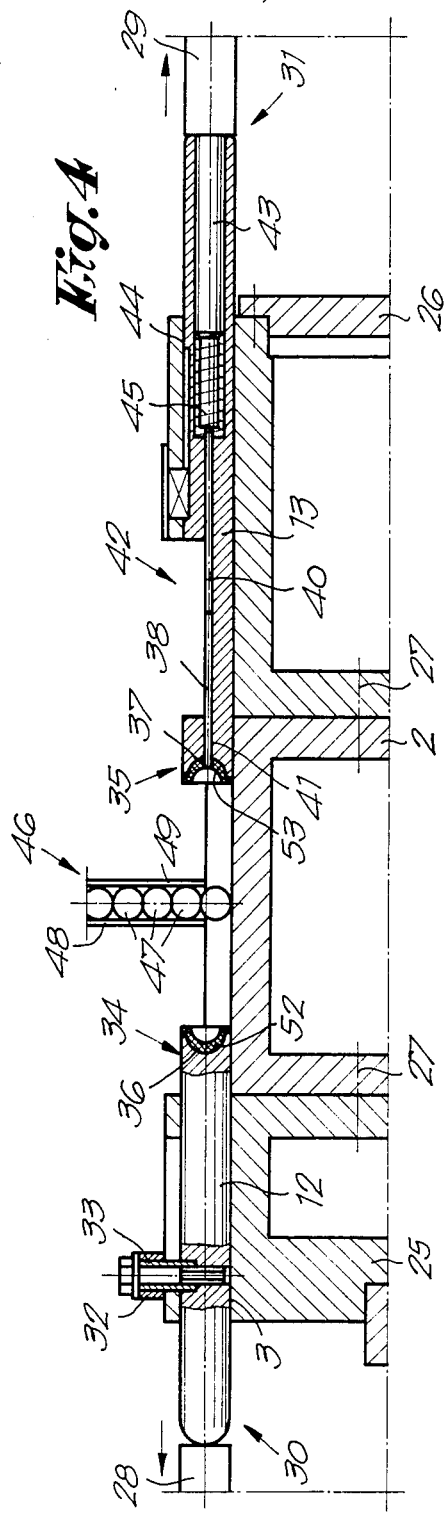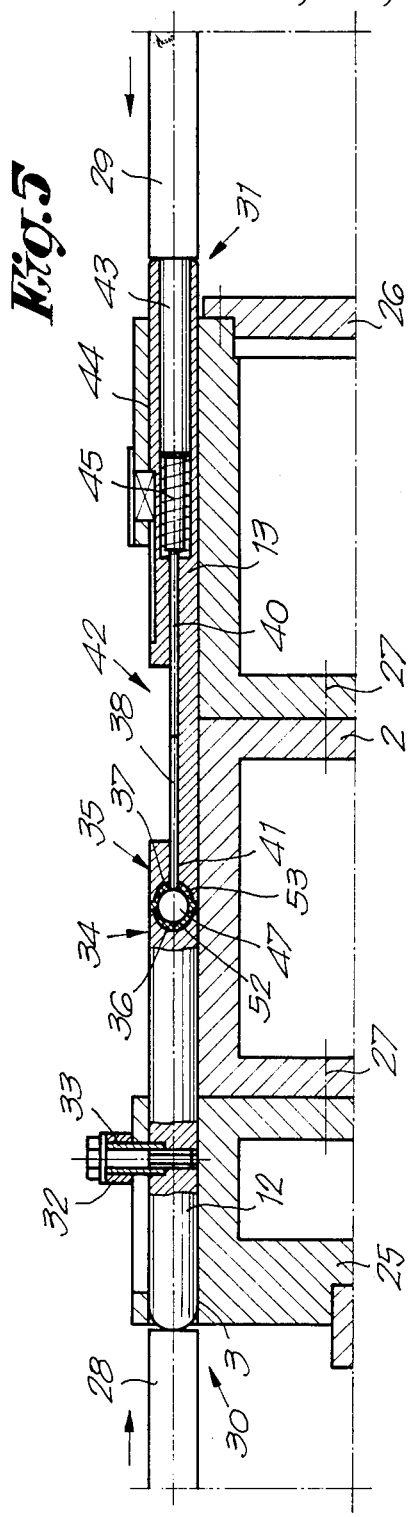

PROCESS FOR THE MANUFACTURE OF LOLLIPOPS, A DEVICE TO BE USED FOR THIS PURPOSE AND THE PRODUCT OBTAINED FROM THIS PROCESS

This invention concerns a process for the manufacture of lollipops, a device with which this process may be carried out and the product or lollipop thus produced.

More specifically, the invention deals with a process for the manufacture of lollipops, the cores of which contain an enclosed separate quantity of sweets, such as spherical sweets for example, and also a device for the production of such lollipops.

The process as specified in the invention consists mainly of the forming in series of two separate lollipop parts from sugar paste, the insertion of a quantity of sweets to be enclosed in the lollipop and the joining of the above-mentioned parts so that they completely encapsulate the contained quantity of sweets.

The device used for the realization of the process as specified in the invention demonstrates a partial similarity with conventional equipment which is mainly based on a drum with a number of semicircular grooves running parallel to the axis of the drum around its circumference and a number of flaps which are connected to an endless chain in such a way that these flaps coincide with the semicircular grooves for part of the circumference of the aforementioned drum in order to create a space or form in which a part of the sugar paste fed into the machine can be formed into a lollipop.

As specified in the present invention, an intermediate element mounted on the above-mentioned flaps is provided to ensure that the mould in which the lollipop is formed in the intital stage of the production process is divided into two parts, thus forming two hollow half lollipops. In addition, mechanisms are also provided to insert a stick into one of halves. Apart from this intermediate element, the invention also provides for an appropriate filling device so that separate items of sweets or possibly other items may be deposited between the lollipop halves at a later stage of the lollipop production process.

In order to obtain the above-mentioned lollipop, the equipment is also provided with the means for bringing the two sticky lollipop halves together in the final stage of the production process such that the quantity of sweets deposited between them is completely encapsulated in the actual lollipop.

With the intention of demonstrating the characteristics of the invention to better advantage, and purely as an example which is in no way limiting, the following description is given of a preferred configuration of a device for the production of lollipops using the process in accordance with the current invention, with references to the accompanying diagrams in which:

FIG. 1 is a view of the device as specified in the invention;
FIG. 2 is a cross-section through II—II in FIG. 1;
FIG. 3 is a cross-section through III—III in FIG. 1
FIG. 4 is a cross-section through IV—IV in FIG. 1;
FIG. 5 is a cross-section through V—V in FIG. 1.

The device for the production of the lollipops indicated in the diagrams mainly consists of a drum (2) driven from a drive shaft (1), a large number of semicircular grooves (3) located around the circumference of the drum and running parallel to its axis, and an endless chain (4) which is formed by the linking together of so-called flaps (5) by means of links (6), so that the endless chain (4) and the drum (2) coincide in such a way that the cylindrical spaces (7) in which the lollipops will be formed are created.

The endless chain (4) runs over three chain wheels (8) in such a way that at least one of these chain wheels (8) is driven so that the flaps (5) are presented to the circumference of the drum (2) and more specifically to the semicircular grooves in it in such a way as to create the cylindrical spaces (7).

The chain wheels (8) are arranged so that the endless chain (4), at leat as specified according to the preferred configuration, is compelled to make contact with the surface of the drum (2) through an angle of approximately 90°.

Sugar paste (10) is inserted between the chain and the drum by means of a feed outlet (9) in a way which is already well known. Up to this point, all the above-mentioned components are already known from existing equipment.

As specified in the invention, the device is provided with an intermediate element (11) which is mounted on the flaps (5) and two movable moulding dies (12 and 13) which can penetrate axially into the cylindrical space (7) through its opposite extremities.

The intermediate element (11) is mounted on the flaps (5) in such a way that when the flaps (5) come into contact with the circumference of the drum (1) the cylindrical space (7) thus created is divided into two approximately equal parts (14 and 15). The intermediate element (11) thus mainly consists of a cylindrical body (16). There are hemispherical projections (17 and 18) on both ends of this body which are directed towards parts 14 and 15 respectively of the cylindrical space (7). There is a chamber (19) inside the intermediate element in which there are two small pistons (20 and 21) which are forced apart by means of a spring (22). The pistons (20 and 21) are fitted with pins (23 and 24) which extend to just outside the spherical surfaces of the projections (17 and 18) when the pistons (20 and 21) are in the forced apart position.

The moulding dies (12 and 13) are positioned opposite each other around the rims of the drum (2) and are located around its complete circumference parallel to its axis and grooves (3). All the moulding dies (12 and 13) in the configuration illustrated are supported by auxiliary drums (25 and 26) which, for example, are connected coaxially with the drum (2) with grooves (3) by means of nuts (27). The moulding dies (12 and 13) consist mainly of complete cylindrical rods which move backwards and forwards in the grooves (3) of the drum (2) and, more specifically, in the cylindrical spaces (7) between the drum (2) and the endless chain (4). The moulding dies (12 and 13) are driven mainly by means of guides (28 and 29) which can press against the ends (30 and 31) of the moulding dies (12 and 13). As illustrated in the left hand moulding die (12) in FIG. 2, the moulding dies may also be fitted with travelling rollers (32) which are mounted on it radially by means of a fixing bush (33).

Naturally, mechanisms may also be provided to constrain the travelling rollers to follow a specific movement. These mechanisms and the mechanisms for withdrawing the moulding dies (12 and 13) from the space (7) after the movement towards each other are not illustrated in the diagram, but it is clear that they may be composed of well-known elements such as springs, etc. which already exist.

There are recesses (36 and 37), preferably hemispherical in shape, in the ends (34 and 35) nearest to each other of the the moulding dies (12 and 13) respectively. Together these create the actual form into which the lollipop will be pressed from the sugar paste.

Obviously, the invention also provides for mechanisms for inserting a stick into each lollipop. These mechanisms are essentially already known and consist of a cartridge (39) from which sticks are supplied and a pin (40) which moves forwards and backwards so that the sticks (38) may be pressed into the cylindrical space (7) through a central aperture (41) in the moulding die (13).

The moulding dies (13), which are fitted to the auxiliary drum (26) along which the cartridge (39) of sticks (38) is fitted, have only a cutout (42) which allows the cartridge to reach the above-mentioned central aperture (41) so that each time the moulding die (13) passes under the cartridge (39) one stick (38) is released into the central aperture (41). The pin (40) is driven by means of a plunger (43) which is enclosed in an axial bore formed in the extremity (31) of the moulding die (13). As illustrated in FIGS. 2–5, the extremity (31) of the plunger (43) protrudes from the bore (44) and comes into contact with the above-mentioned guide (29). At the same time, there is also a compression spring (45) fitted between the plunger (43) and the actual moulding die (13).

Finally, the device as specified in the invention also provides for a filling device (46) for the supply of a quantity of sweets (47) to be enclosed inside the lollipop which, according to the configuration illustrated in the diagrams, mainly consists of a filling funnel (48) and a supply duct (49).

The operation of the device or, in other words, the process as specified in the invention, is described below by means of reference to FIG. 1 and more specifically by means of the various stages in the lollipop production process as illustrated in FIGS. 2–5.

As illustrated in FIG. 1, sugar paste (10) is guided between the rotating drum (2) and the endless chain (4) through the feed outlet (9). Because the flaps (5) come into contact with the grooves (3) of the drum (2), a cylindrical space (7) is formed so that a portion of the sugar paste (10) is cut off and enclosed in the abovementioned space (7). Since there are intermediate elements (11) in the cylindrical space (7), the process will involve either two streams of sugar paste (10) or one stream of sugar paste (10) which has been separated longitudinally into two parts, so that in either case care is taken to ensure that portions of sugar paste (50 and 51) reach both parts (14 and 15) respectively of each space (7). At the very beginning of the production process, a stick is released from the cartridge (38) into the central aperture (41) and more specifically into the part of it which is directly under the cartridge (39). After the moulding die (13) which has picked up a stick (38) has moved past the cartridge (39) due to the fact that the drum (2) has continued to rotate, the drive of the moulding dies (12 and 13) causes them to move towards each other. This results in the streams of sugar paste (50 and 51), as illustrated in FIG. 3, being compressed into two lollipop parts in the shape of hemispherical shells (52 and 53) between the projections (17 and 18) of the intermediate element (11) and the extremities (34 and 35) of the moulding dies (12 and 13) which are directed towards each other and more specifically their recesses (36 and 37).

As illustrated in FIG. 3, the plunger (43) is pressed against the resistance of the compression spring (45) in the bore (44) so that the pin (40) presses the stick (38) deposited in the central aperture (41) into part (15) of the space (7). The stick (38) thus just extends as far as the recess (37) of the extremity (35) of the moulding die (13), resulting in this stick (38) being pressed against the intermediate element (11).

Then, as illustrated in FIG. 4, the moulding dies (12 and 13) move apart. The two lollipop parts (52 and 53) remain located in the recesses (36 and 37). They do not continue to adhere to the intermediate element (11) because the pins (23 and 24) release the parts (52 and 53) from the projections (17 and 18) by means of the spring (22). The intermediate element (11) and the flap (5) which closes off the uppermost part of the cylindrical space (7) are removed from between the moulding dies (12 and 13) due to the endless chain no longer remaining in contact with the drum (2). In a subsequent stage of the production process, a quantity of sweets (47) to be enclosed between the lollipop parts (52 and 53) is then deposited into the vacated space (7). The moulding dies (12 and 13) are then moved back towards each other, with the result that the element (47) is enclosed between the hemispherical shells formed from the lollipop parts (52 and 53). Once the rims of the lollipop parts (52 and 53) come into contact they adhere together, thus forming a solid lollipop with halves which may no longer be separated.

The lollipops are finally removed from the device in a way not illustrated in the diagrams.

The invention also concerns the product which is obtained by the process as specified in the invention or, in other words, the lollipop containing an enclosed quantity of sweets (47). It is evident that this lollipop does not necessarily have to be spherical in shape and it is possible for it to assume any other shape without it falling outside the scope of the invention. This also applies to the enclosed quantity of sweets (47). This will preferably consist of a spherical sweet but may also consist of a liquid, whether solidified or not, or a dough-like product or similar. In this case, this will preferably be a "magic ball" type of sweet which repeatedly changes colour as it is sucked.

In the event that a liquid or dough-like product is inserted between the lollipop parts (52 and 53), the filling device (46) must obviously be suitable for this.

It is clear that many variations of the device for the production of lollipops described here are possible without the scope of the invention being exceeded.

Thus, for example, in the vicinity of line V—V in FIG. 1, a guide or a wheel with a number of cutouts which turns at the same time may also be fitted around the circumference of the drum (2) so that during the compression of the hollow hemispherical lollipop parts (52 and 53) the upper side of the cylindrical space (7) is also sealed off, thus preventing any sugar escaping along the edges of the extremities (34 and 35) of the moulding dies (12 and 13) during the forming operation.

Naturally, such a device may be constructed according to different methods. Thus the drum (2) may rotate about either a vertical or a horizontal axis according to the different possibilities.

This invention is in no way limited to the configuration described as an example and illustrated in the accompanying diagrams, but such a device for the production of lollipop according to the process in the invention may be constructed in various configurations and sizes without exceeding the scope of the invention.

I claim:

1. In a process of forming lollipops from a continuously supplied stream of sugar paste, said process characterized by the steps of:

separating the end portion of said stream into two substantially equal portions and depositing said portions along an axis on opposite sides of a central molding element;

molding each said portion into two substantially identical hemispherical shells using a guide means and two molding dies wherein said molding dies are aligned along said axis and move toward said central molding element thereby compressing said portions between said dies and said central molding element and wherein said guide means substantially precludes any portion of said paste from escaping during the molding process;

affixing a handle to one of said hemispherical shells;

separating said molding dies and shells from said central molding element and thereafter removing said central molding element; and introducing a sweet substance between said shells and restraining said sweet substance along said axis by the use of a restraining means, and forming a substantially spherical lollipop by bringing together and affixing said shells by moving said dies together along said axis, thereby enclosing said sweet substance within the hollow portion formed by said shells.

2. In a process of forming lollipops from a continuously supplied stream of sugar paste, said process characterized by the steps of:

introducing a continuous stream of said paste into a series of cylindrical spaces formed by semicircular grooves positioned along the circumference of a drum, said cylindrical spaces having a central molding element along an axis wherein equal portions of said paste are placed along said axis on either side of said central molding element;

molding said paste using a flap carried by an endless chain which brings said flap into contact with said groove and moving two diametrically positioned molding dies along said axis toward said central molding element, thereby pressing said portions between said dies and said central molding element and forming two substantially identical hemispherical shells;

retracting said die and separating said shells from said central molding element and removing said central molding element;

introducing a high viscosity or solid sweet substance between said shells along said axis;

bringing said shells together along said axis by means of said molding dies, thereby enclosing said sweet substance and forming a substantially spherical lollipop; and affixing a handle to said spherical sweet by inserting an elongated member into the lollipop.

* * * * *